United States Patent
Huang et al.

(10) Patent No.: US 9,900,234 B2
(45) Date of Patent: Feb. 20, 2018

(54) DIRECT LINK QUALITY MONITORING METHOD, COMMUNICATIONS DEVICE, AND SYSTEM

(71) Applicant: Huawei Technologies Co., Ltd., Shenzhen (CN)

(72) Inventors: Zhengquan Huang, Beijing (CN); Yamin Zhang, Beijing (CN); Yezhuan Xie, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 308 days.

(21) Appl. No.: 14/737,942

(22) Filed: Jun. 12, 2015

(65) Prior Publication Data

US 2015/0372894 A1 Dec. 24, 2015

(30) Foreign Application Priority Data

Jun. 18, 2014 (CN) .......................... 2014 1 0272439

(51) Int. Cl.
*G06F 15/16* (2006.01)
*H04L 12/26* (2006.01)
(Continued)

(52) U.S. Cl.
CPC .............. *H04L 43/10* (2013.01); *H04L 41/30* (2013.01); *H04L 43/08* (2013.01);
(Continued)

(58) Field of Classification Search
CPC ...... H04W 4/02; H04W 36/30; H04B 17/309; H04L 45/46
See application file for complete search history.

(56) References Cited

U.S. PATENT DOCUMENTS

2005/0063313 A1 3/2005 Nanavati et al.
2007/0233626 A1* 10/2007 Rupp ..................... G06Q 10/10
706/20
(Continued)

FOREIGN PATENT DOCUMENTS

CN 102572991 A 7/2012
EP 1978689 A1 10/2008
WO WO 2009093215 A1 7/2009

OTHER PUBLICATIONS

Gerla et al., "Multicluster, mobile, multimedia radio network," Wireless Networks, vol. 1, Issue 3, pp. 255-265 (Oct. 1995).

*Primary Examiner* — Hieu Hoang
(74) *Attorney, Agent, or Firm* — Leydig, Voit & Mayer, Ltd.

(57) ABSTRACT

The present disclosure discloses a direct-link quality monitoring method, communications device, and system, where the method includes: determining, by a local device after establishing a neighbor relationship with a peer device, whether a quantity of neighbors of the local device is the same as a quantity of neighbors of the peer device; if the quantity of neighbors of the local device is different from the quantity of neighbors of the peer device, electing a device, either the local device or the peer device, with a larger quantity of neighbors as a measurement control point MCP of a direct link between the local device and the peer device; and executing a corresponding monitoring operation according to whether the local device is the MCP of the direct link, so as to monitor quality of the direct link together with the peer device.

18 Claims, 8 Drawing Sheets

(51) Int. Cl.
*H04L 12/24* (2006.01)
*H04L 29/08* (2006.01)
*H04W 36/30* (2009.01)
*H04B 17/309* (2015.01)
*H04L 12/715* (2013.01)
*H04W 4/02* (2018.01)

(52) U.S. Cl.
CPC ...... *H04L 67/1051* (2013.01); *H04L 67/1061* (2013.01); *H04L 67/1093* (2013.01); *H04B 17/309* (2015.01); *H04L 45/46* (2013.01); *H04W 4/02* (2013.01); *H04W 36/30* (2013.01)

(56) References Cited

U.S. PATENT DOCUMENTS

| | | | | |
|---|---|---|---|---|
| 2008/0247353 | A1* | 10/2008 | Pun | H04L 45/46 370/328 |
| 2008/0268855 | A1* | 10/2008 | Hanuni | H04W 72/0406 455/445 |
| 2010/0189005 | A1* | 7/2010 | Bertani | H04W 74/02 370/252 |
| 2012/0026869 | A1* | 2/2012 | Wang | H04L 41/5003 370/230 |
| 2012/0177016 | A1* | 7/2012 | Trainin | H04W 84/20 370/338 |
| 2014/0169335 | A1* | 6/2014 | Franklin | H04W 8/082 370/332 |

\* cited by examiner

DIRECT LINK QUALITY MONITORING METHOD, COMMUNICATIONS DEVICE, AND SYSTEM

CROSS-REFERENCE TO RELATED APPLICATION

This application claims priority to Chinese Patent Application No. 201410272439.X. filed on Jun. 18, 2014, which is hereby incorporated by reference in its entirety.

TECHNICAL FIELD

The present disclosure relates to the field of network technologies, and in particular, to a direct-link quality monitoring method, communications device, and system.

BACKGROUND

With continuous improvement of network information technologies, sizes of networks of network operators are constantly expanding, and requirements of users on network quality are increasingly higher. In order to monitor network operating performance and to promptly identify problems when faults occur on a network, the network operators have developed a network quality monitoring technology.

When network quality monitoring is performed, if a network fault occurs on a direct link, it is difficult for a network management system to locate the direct link, between two communications devices, on which the network fault occurs; in this case, first, a Link Layer Discovery Protocol (LLDP) technology is generally used to discover direct links between communications devices on a network and a topological relationship among all the communications devices; then, a measurement control point (MCP) is manually deployed on one communications device of each pair of two neighboring communications devices on the network, and a data collecting point (DCP) is manually deployed on the other device; and the MCP collects statistics on monitoring data of a direct link between the two communications devices, and reports the monitoring data to the network management system.

Although a current commonly-used link quality monitoring technology can enable a network management system to monitor operating performance of an entire network, when a size of a network is relatively large, a topological relationship among devices is relatively complex, and manually deploying MCPs and DCPs not only requires heavy workload and consumes a relatively large quantity of man power but also easily causes errors and omissions. In addition, in a current MCP deployment manner, there are a relatively large quantity of MCPs on a network, which may reduce efficiency of communication between an MCP and a network management device. Therefore, a technology that can automatically and efficiently completes direct-link quality monitoring on a network is needed.

SUMMARY

The present disclosure provides a direct-link quality monitoring method, communications device, and system, which are used to resolve a problem in the prior art in which quality monitoring on a direct link on a network cannot be automatically completed and efficiency of communication between a network management device and an MCP is caused to be low by a larger quantity of MCPs.

A first aspect of the present disclosure provides a direct-link quality monitoring method, where the method includes:

determining, by a local device after establishing a neighbor relationship with a peer device, whether a quantity of neighbors of the local device is the same as a quantity of neighbors of the peer device;

if the quantity of neighbors of the local device is different from the quantity of neighbors of the peer device, electing a device, either the local device or the peer device, with a larger quantity of neighbors as a measurement control point MCP of a direct link between the local device and the peer device; and executing a corresponding monitoring operation according to whether the local device is the MCP of the direct link, so as to monitor quality of the direct link together with the peer device.

A second aspect of the present disclosure provides a communications device, where the device includes:

a first determining unit, configured to determine, after a neighbor relationship is established with a peer device, whether a quantity of neighbors of a local device is the same as a quantity of neighbors of the peer device;

a first electing unit, configured to: when the quantity of neighbors of the local device is different from the quantity of neighbors of the peer device, elect a device, either the local device or the peer device, with a larger quantity of neighbors as a measurement control point MCP of a direct link between the local device and the peer device; and a monitoring unit, configured to execute a corresponding monitoring operation according to whether the local device is the MCP of the direct link, so as to monitor quality of the direct link together with the peer device.

A third aspect of the present disclosure provides a direct-link quality monitoring system, including at least a network management device and two neighboring communications devices, where each of the two neighboring communications devices is the communications device according to the second aspect.

By implementing the present disclosure, after two communications devices establish a neighbor relationship, an MCP may be automatically elected according to quantities of neighbors of the two devices; after the MCP is elected, the MCP is responsible for collecting statistics on data that is of the two devices operating on a direct link between the two devices, to obtain operating data that is of the direct link and that is related to network quality; and sends the operating data to a network management device, so that the network management device monitors an operating condition of the direct link on a network. Automatically electing the MCP has high accuracy and is not prone to errors or omissions, and does not require manual deployment of MCPs, which may save a large amount of man power in a case of a large network size; in addition, electing a device, on the direct link, with a larger quantity of neighbors as the MCP may enable multiple direct links to share one MCP, thereby effectively reducing a quantity of MCPs on the network and improving efficiency of communication between the network management device and the MCP.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
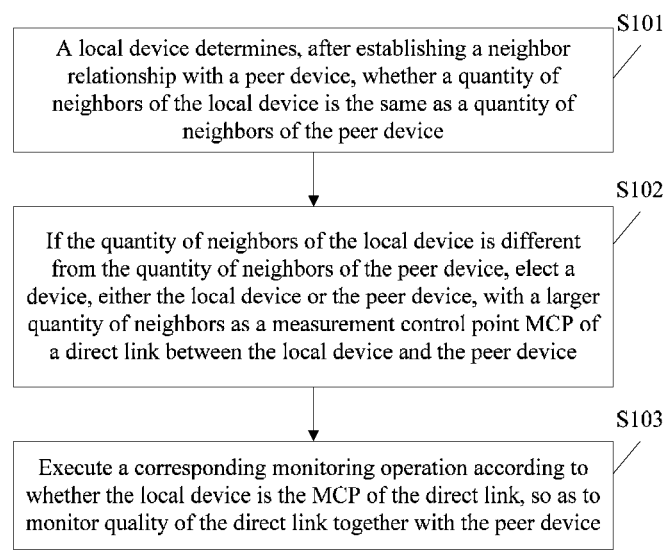
FIG. 1 is a schematic flowchart of a direct-link quality monitoring method according to an embodiment of the present disclosure.

Referring to FIG. 1, FIG. 1 is a schematic flowchart of a direct-link quality monitoring method according to an embodiment of the present disclosure. FIG. 1 is described by using an example in which the method is executed by a local device, where the local device may be any communications device on a network. As shown in FIG. 1, the method may include the following steps:

S101: A local device determines, after establishing a neighbor relationship with a peer device, whether a quantity of neighbors of the local device is the same as a quantity of neighbors of the peer device.

In a specific implementation, that the local device establishes the neighbor relationship with the peer device may specifically be that:

the local device first sends a Hello message in a multicast manner, then receives a Hello reply message returned by the peer device, and finally stores the neighbor relationship between the local device and the peer device; or the local device queries, when receiving a Hello message sent by the peer device, whether the neighbor relationship has been established with the peer device, and if not, returns a Hello reply message to the peer device, and stores the neighbor relationship between the local device and the peer device.

In a specific implementation, a Hello message may carry some pieces of parameter information of a device sending the Hello message, for example, a device identifier, an interface identifier of the device, an interface MAC address of the device, and a network management address of the device. After the neighbor relationship between the local device and the peer device is stored, the local device may acquire the foregoing parameter information of the peer device, and communicate with the peer device.

After establishing the neighbor relationship with the peer device, optionally, the local device may send an election message to the peer device, or receive an election message sent by the peer device, where the election message carries parameters used to elect an MCP, for example, a quantity of neighbors and a quantity of interfaces of a device sending the election message. In this embodiment, the local device may receive the election message sent by the peer device, to acquire the quantity of neighbors of the peer device, so as to determine whether the quantity of neighbors of the local device is the same as the quantity of neighbors of the peer device.

S102: If the quantity of neighbors of the local device is different from the quantity of neighbors of the peer device, elect a device, either the local device or the peer device, with a larger quantity of neighbors as a measurement control point MCP of a direct link between the local device and the peer device.

For an entire network, if more direct links share one MCP, a quantity of MCPs on the network becomes smaller; and a larger quantity of neighbors of one communications device indicates a larger quantity of direct links between the communications device and its neighbors. Therefore, in this embodiment of the present disclosure, the device, either the local device or the peer device, with the larger quantity of neighbors serves as the MCP of the direct link between the local device and the peer device. Correspondingly, for any two neighboring communications devices on the network, when an MCP is elected, a device with a larger quantity of neighbors is elected as an MCP of a direct link between the two devices, which may greatly reduce a quantity of MCPs on the network. For example, if the local device is A, device A establishes a neighbor relationship separately with device B, device C, and device D, and a quantity of neighbors of device A is larger than a quantity of neighbors of device B, device C, and device D separately, and if device A serves as an MCP of three direct links, that is, a direct link between device A and device B, a direct link between device A and device C, and a direct link between device A and device D separately, there is only one MCP of the three direct links, which may minimize the quantity of MCPs.

As a possible implementation manner, when the quantity of neighbors of the local device is the same as the quantity of neighbors of the peer device, whether an MCP weight value of the local device is the same as an MCP weight value of the peer device is further determined; if the MCP weight value of the local device is different from the MCP weight value of the peer device, a device, either the local device or the peer device, with a larger MCP weight value is elected as the MCP of the direct link.

In this embodiment of the present disclosure, the election message may further carry an MCP weight value of the device sending the election message, where an MCP weight value of any communications device is used to indicate frequency (English: frequency) that the device serves as an MCP of all direct links between the device and all neighbors. For example, device A has totally three neighbors, that is, device B, device C, and device D, where device A serves as an MCP of direct links between device A and device C and between device A and device D, and then frequency that device A serves as an MCP is 2, and an MCP weight value of device A may be 2, or may be a value obtained after calculation based on the frequency 2. Each time after the local device is elected as an MCP, a preset value may be added to frequency that the local device serves as an MCP, for example, 1 is added; correspondingly, each time when the local device changes from an MCP to a DCP, the preset value is subtracted from the frequency that the local device serves as an MCP, so as to correspondingly adjust the MCP weight value.

As a possible implementation manner, when the quantity of neighbors of the local device is the same as the quantity of neighbors of the peer device, and the MCP weight value of the local device is the same as the MCP weight value of the peer device, whether a quantity of interfaces of the local device is the same as a quantity of interfaces of the peer device may further be determined. If the quantity of interfaces of the local device is different from the quantity of interfaces of the peer device, a device, either the local device or the peer device, with a larger quantity of interfaces is elected as the MCP of the direct link; and if the quantity of interfaces of the local device is the same as the quantity of interfaces of the peer device, a device, either the local device or the peer device, with a larger interface MAC address is elected as the MCP of the direct link.

As a possible implementation manner, when the quantity of neighbors of the local device is the same as the quantity of neighbors of the peer device, and the MCP weight value of the local device is the same as the MCP weight value of the peer device, a device, either the local device or the peer device, with a larger interface MAC address is elected as the MCP of the direct link.

S103: Execute a corresponding monitoring operation according to whether the local device is the MCP of the direct link, so as to monitor quality of the direct link together with the peer device.

In this embodiment of the present disclosure, two neighboring communications devices separately serve as an MCP and a DCP in a direct link between them. The MCP is responsible for communicating with a network management device, and collects statistics on operating data of the MCP and the DCP operating on the direct link, so as to obtain operating data of the direct link and report the operating data to the network management device; the DCP is responsible for sending data of the DCP operating on the direct link to the MCP, and the MCP completes data collecting, statistics, and reporting.

As a possible implementation manner, the executing a corresponding monitoring operation according to whether the local device is the MCP of the direct link, so as to monitor quality of the direct link together with the peer device may include:

periodically acquiring first data that is generated in a process in which the local device operates in an outbound direction and in an inbound direction of the direct link;

if the local device is the MCP of the direct link, receiving second data that is of the peer device operating in an outbound direction and in an inbound direction of the direct link and that is periodically sent by the peer device;

collecting statistics on the first data and the second data, so as to obtain operating data of the direct link; and periodically sending the operating data of the direct link to the network management device, so that the network management device monitors an operating condition of the direct link on the network.

As another possible implementation manner, the executing a corresponding monitoring operation according to whether the local device is the MCP of the direct link, so as to monitor quality of the direct link together with the peer device may include:

periodically acquiring first data that is generated in a process in which the local device operates in an outbound direction and in an inbound direction of the direct link; and if the peer device is the MCP of the direct link, periodically sending, by the local device, the first data to the peer device.

In this case, the peer device is responsible for collecting statistics according to the first data and second data that is of the peer device operating in an outbound direction and in an inbound direction of the direct link to obtain operating data of the direct link, and sends the operating data of the direct link to the network management device.

In a specific implementation, before the executing a corresponding monitoring operation according to whether the local device is the MCP of the direct link, the local device and the peer device may first negotiate monitoring parameters, where the monitoring parameters may include a monitoring period and at least one monitoring indicator; then, the local device and the peer device monitor the quality of the direct link according to the negotiated monitoring parameters. Specifically, the monitoring indicator may be a network test indicator such as a packet loss rate, a delay, a jitter, or a bit error rate.

In a specific implementation, the first data includes data that is generated in a process in which the local device operates in the outbound direction and in the inbound direction of the direct link and that is related to the negotiated monitoring indicator; the second data includes data that is generated in a process in which the peer device operates in the outbound direction and in the inbound direction of the direct link and that is related to the negotiated monitoring indicator. For example, if the monitoring indicator is a packet loss rate, the first data includes a quantity inpkts1 of data packets received on the direct link by the local device and a quantity outpkts1 of data packets sent on the direct link by the local device; correspondingly, the second data includes a quantity inpkts2 of data packets received on the direct link by the peer device and a quantity outpkts2 of data packets sent on the direct link by the peer device; and then, a packet loss rate, in a direction from the local device to the peer device, on the direct link is: pktloss1=(outpkts1−inpkts2)/outpkts1, and a packet loss rate, in a direction from the peer device to the local device, on the direct link is: pktloss2=(outpkts2−inpkts1)/outpkts2.

In a specific implementation, there may be multiple direct links on which the local device is located, and when the local device serves as the MCP of a direct link, the local device may serve as a DCP or an MCP of another direct link.

In a specific implementation, the local device may serve as an MCP of multiple direct links. In this case, as a possible implementation manner, the local device may send operating data of the multiple direct links together to the network management device, so as to reduce a quantity of times of communication with the network management device, and to improve communication efficiency.

As another possible implementation manner, the local device may also separately send operating data of the multiple direct links to the network management device.

After collecting statistics on the operating data of the direct links on the network, the network management device may have an overall understanding of an operating condition of all direct links on the entire network, thereby completing quality monitoring on the direct links on the network.

In this embodiment of the present disclosure, after two communications devices establish a neighbor relationship, an MCP is automatically elected according to quantities of neighbors of the two devices; after the MCP is elected, the MCP is responsible for collecting statistics on data that is of the two devices operating on a direct link between the two devices, to obtain operating data that is of the direct link and that is related to network quality; and sends the operating data to a network management device, so that the network management device monitors an operating condition of the direct link on a network. Automatically electing the MCP has high accuracy and is not prone to errors or omissions, and also does not require manual deployment of MCPs, which may save a large amount of man power in a case of a large network size; in addition, electing a device, on the direct link, with a larger quantity of neighbors as the MCP may enable multiple direct links to share one MCP, thereby effectively reducing a quantity of MCPs on the network and improving efficiency of communication between the network management device and the MCP.

Figure 2A:
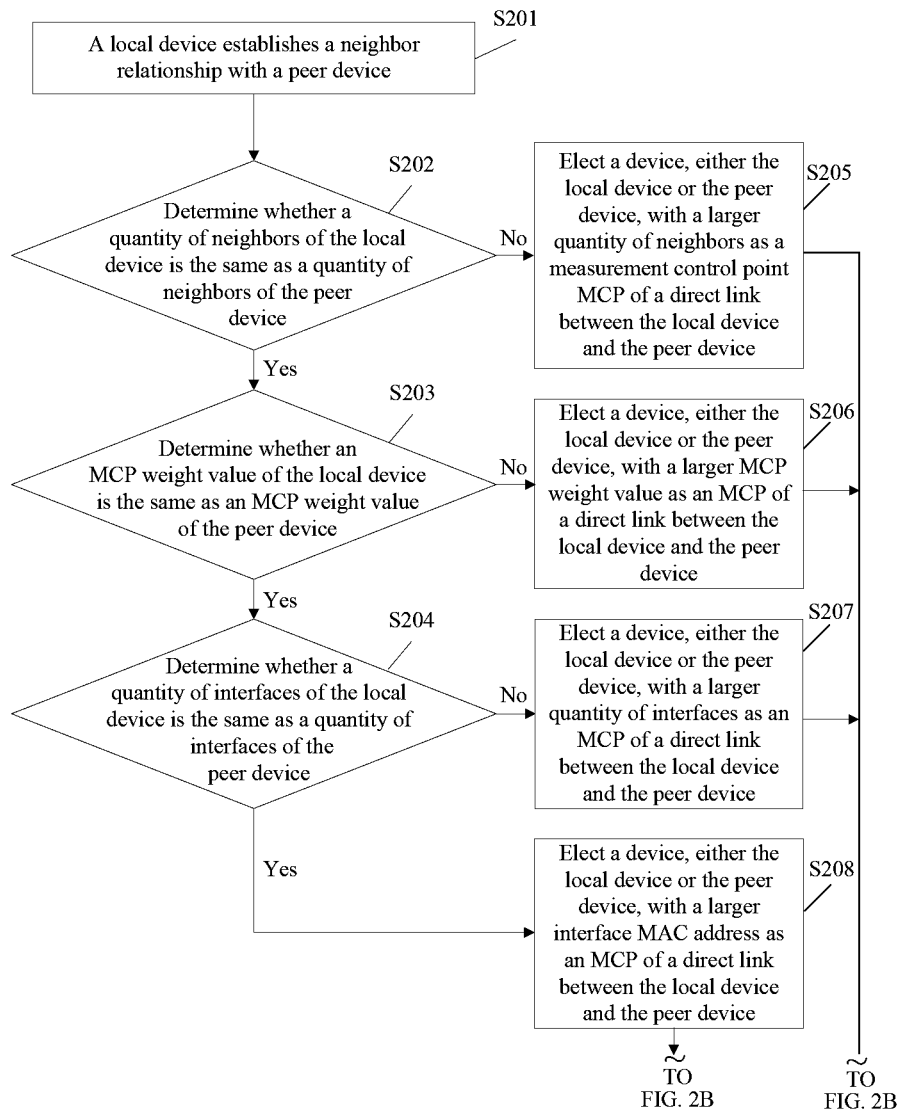
FIG. 2A and FIG. 2B are a schematic flowchart of a direct-link quality monitoring method according to another embodiment of the present disclosure.
Figure 2B:
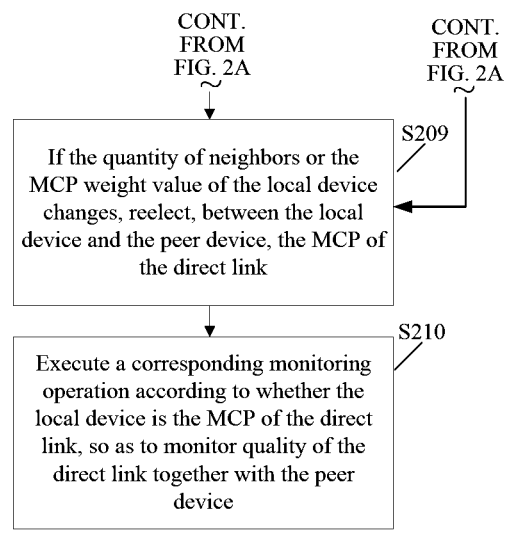

Referring to FIG. 2A and FIG. 2B, FIG. 2A and FIG. 2B are a schematic flowchart of a direct-link quality monitoring method according to another embodiment of the present disclosure. FIG. 2A and FIG. 2B are described by using an example in which the method is executed by a local device, where the local device may be any communications device on a network. As shown in FIG. 2A and FIG. 2B, the method may include the following steps:

S201: A local device establishes a neighbor relationship with a peer device.

In a specific implementation, that the local device establishes the neighbor relationship with the peer device may specifically be that:

the local device first sends a Hello message in a multicast manner, then receives a Hello reply message returned by the peer device, and finally stores the neighbor relationship between the local device and the peer device; or the local device queries, when receiving a Hello message sent by the peer device, whether the neighbor relationship has been established with the peer device, and if not, returns a Hello reply message to the peer device, and stores the neighbor relationship between the local device and the peer device.

S202: Determine whether a quantity of neighbors of the local device is the same as a quantity of neighbors of the peer device; if yes, go to step S203; and otherwise, go to step S205.

In this embodiment, for a specific implementation manner in which the local device determines whether the quantity of neighbors of the local device is the same as the quantity of neighbors of the peer device, reference may be made to the descriptions of the embodiment shown in FIG. 1, and details are not repeatedly described in this embodiment.

S203: Determine whether an MCP weight value of the local device is the same as an MCP weight value of the peer device; if yes, go to step S204; and otherwise, go to step S206.

In this embodiment, for a specific implementation manner in which the local device determines whether the MCP weight value of the local device is the same as the MCP weight value of the peer device, reference may be made to the descriptions of the embodiment shown in FIG. 1, and details are not repeatedly described in this embodiment.

S204: Determine whether a quantity of interfaces of the local device is the same as a quantity of interfaces of the peer device; if yes, go to step S208; and otherwise, go to step S207.

A quantity of interfaces of a communications device indicates a quantity of existing and potential neighbors of the device. In a specific implementation, if two neighboring communications devices are the same in both a quantity of neighbors and an MCP weight value, a device, either of the two devices, with a larger quantity of interfaces may be elected as an MCP of a direct link between the two devices, so that a device with a larger quantity of potential neighbors is elected as the MCP as much as possible.

S205: Elect a device, either the local device or the peer device, with a larger quantity of neighbors as a measurement control point MCP of a direct link between the local device and the peer device, and then go to step S209.

S206: Elect a device, either the local device or the peer device, with a larger MCP weight value as an MCP of a direct link between the local device and the peer device, and then go to step S209.

S207: Elect a device, either the local device or the peer device, with a larger quantity of interfaces as an MCP of a direct link between the local device and the peer device, and then go to step S209.

S208: Elect a device, either the local device or the peer device, with a larger interface MAC address as an MCP of a direct link between the local device and the peer device, and then go to step S209.

On a network, an interface MAC address of a communications device may identify a location of the communications device, and is unique and unchangeable. In a specific implementation, if the two neighboring communications devices are the same not only in a quantity of neighbors and an MCP weight value but also in a quantity of interfaces, as a possible implementation manner, interface MAC addresses of the two devices may be compared, and a device, either of the two devices, with a larger interface MAC address is elected as the MCP of the direct link between the two devices. Because an interface MAC address of a device is mainly used to distinguish the device from another device, as another possible implementation manner, a device, either of the two devices, with a smaller interface MAC address may also be elected as the MCP of the direct link between the two devices.

S209: If the quantity of neighbors or the MCP weight value of the local device changes, reelect, from the local device and the peer device, the MCP of the direct link.

In this embodiment of the present disclosure, two neighboring communications devices separately serve as an MCP and a DCP in a direct link between them. The MCP is responsible for communicating with a network management device, and may collect statistics on data that is of the MCP and the DCP operating on the direct link, so as to obtain operating data of the direct link and report the operating data to the network management device; the DCP is responsible for sending data of the DCP operating on the direct link to the MCP, and the MCP completes data collecting, statistics, and reporting.

In a specific implementation, after an MCP is elected for a direct link, a device serving as the MCP may change as a condition changes. As a possible implementation manner, if the quantity of neighbors or the MCP weight value of the local device changes, the MCP of the direct link may be reelected from the local device and the peer device. Correspondingly, because the local device and the peer device may be any communications device on the network, and the direct link may also be a direct link formed between any two neighboring communications devices on the network, if a quantity of neighbors or an MCP weight value of any communications device on the network changes, it may be triggered that an MCP is reelected for all direct links between the communications device and its neighbors.

Specifically, steps of reelecting, by the local device, the MCP for the direct link between the local device and the peer device may include:

if the quantity of neighbors of the local device is different from the quantity of neighbors of the peer device, electing a device, either the local device or the peer device, with a larger quantity of neighbors as the MCP of the direct link; and if the quantity of neighbors of the local device is the same as the quantity of neighbors of the peer device, and the MCP weight value of the local device is different from the MCP weight value of the peer device, electing a device, either the local device or the peer device, with a larger MCP weight value as the MCP of the direct link.

In a specific implementation, once a quantity of neighbors or an MCP weight value of any communications device on the network changes, it may be triggered that an MCP is reelected for all direct links between the communications device and its neighbors, so as to ensure that a device, either one of each pair of neighbors on the network, with a larger quantity of neighbors always serves as an MCP of a direct link between this pair of neighbors, and only when quantities of neighbors of this pair of neighbors are the same, a device with a larger MCP weight value serves as the MCP of the direct link between this pair of neighbors, thereby ensuring that a quantity of MCPs on the network is always minimum.

In this embodiment, reelecting the MCP occurs before the local device and the peer device execute corresponding operations according to their respective roles to monitor the direct link; therefore, only after roles (the MCP and the DCP) of the local device and the peer device are relatively stable, the MCP starts collecting statistics on the operating data of the direct link and communicating with the network management device, so as to reduce a quantity of times that the roles of the local device and the peer device change in a monitoring process, and to increase stability of the MCP.

S210: Execute a corresponding monitoring operation according to whether the local device is the MCP of the direct link, so as to monitor quality of the direct link together with the peer device.

In this embodiment, for an operation of step S210, reference may be made to the descriptions of step S103, and details are not repeatedly described in this embodiment.

In this embodiment of the present disclosure, after two devices establish a neighbor relationship, either device of the two devices may automatically elect an MCP of a direct link between the two devices according to some hardware parameters of the two devices, and the MCP is responsible for collecting statistics on data that is of the two devices operating on the direct link between the two devices, to obtain operating data that is of the direct link and that is related to network quality, and sends the operating data to a network management device, so that the network management device monitors an operating condition of the direct link on a network. Automatically electing the MCP has high accuracy and is not prone to errors or omissions, and does not require manual deployment of MCPs, which may save a large amount of man power in a case of a large network size. Specifically, in this embodiment of the present disclosure, a device, on the direct link, with a larger quantity of neighbors is preferably elected as the MCP; when quantities of neighbors of the two devices are the same, the MCP is then elected according to values of parameters such as MCP weight values, quantities of interfaces, and interface MAC addresses of the two devices sequentially, which may enable multiple direct links to share one MCP, thereby effectively reducing a quantity of MCPs on the network, and improving efficiency of communication between the network management device and the MCP. In addition, when a quantity of neighbors or an MCP weight value of a device changes, an MCP may be reelected for all direct links on which the device and its neighbors are located, so that a quantity of MCPs on the network is always kept minimum.

Figure 3A:
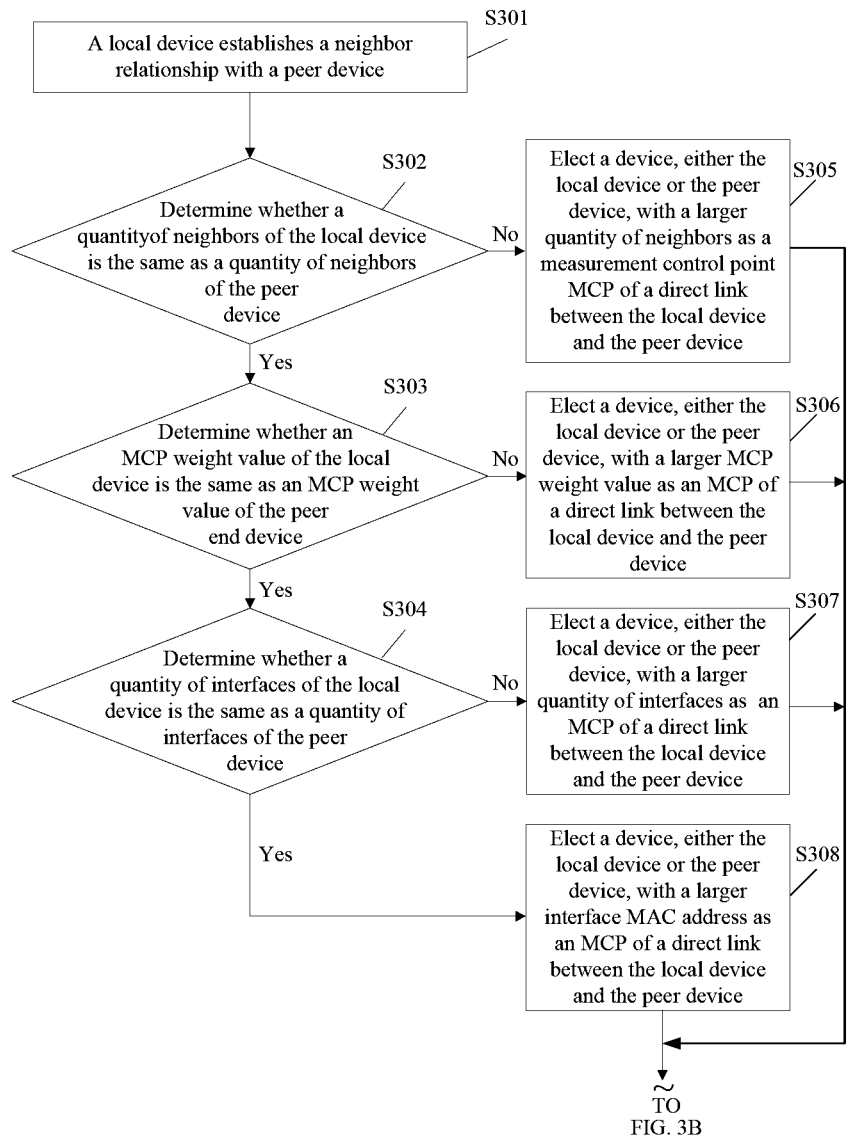
FIG. 3A and FIG. 3B are a schematic flowchart of a direct-link quality monitoring method according to still another embodiment of the present disclosure.
Figure 3B:
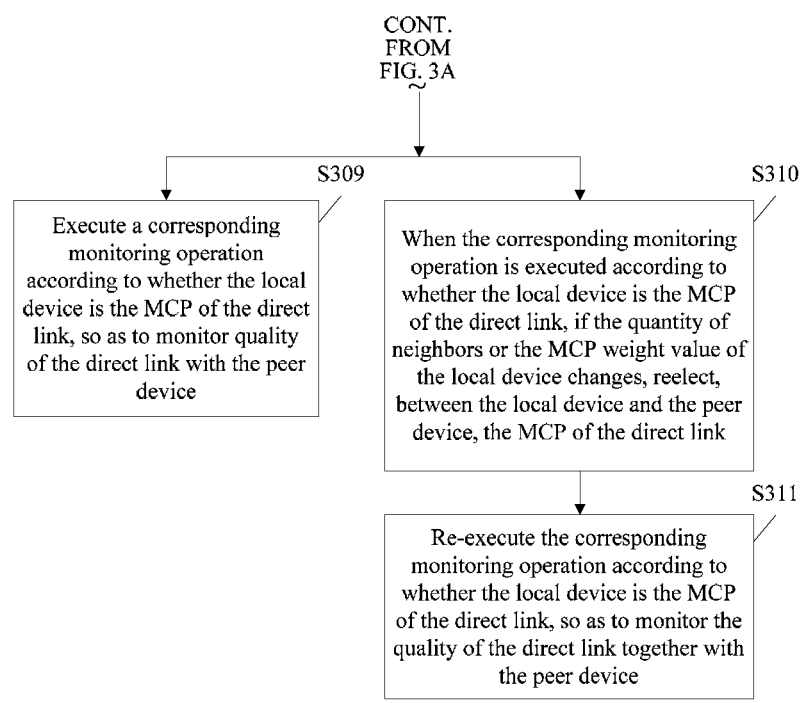

Referring to FIG. 3A and FIG. 3B, FIG. 3A and FIG. 3B are a schematic flowchart of direct-link quality monitoring method according to another embodiment of the present disclosure. FIG. 3A and FIG. 3B are described by using an example in which the method is executed by a local device, where the local device may be any communications device on a network. As shown in FIG. 3A and FIG. 3B, the method may include the following steps:

S301: A local device establishes a neighbor relationship with a peer device.

S302: Determine whether a quantity of neighbors of the local device is the same as a quantity of neighbors of the peer device; if yes, go to step S303; and otherwise, go to step S305.

S303: Determine whether an MCP weight value of the local device is the same as an MCP weight value of the peer device; if yes, go to step S304; and otherwise, go to step S306.

S304: Determine whether a quantity of interfaces of the local device is the same as a quantity of interfaces of the peer device; if yes, go to step S308; and otherwise, go to step S307.

S305: Elect a device, either the local device or the peer device, with a larger quantity of neighbors as a measurement control point MCP of a direct link between the local device and the peer device, and then go to step S309.

S306: Elect a device, either the local device or the peer device, with a larger MCP weight value as an MCP of a direct link between the local device and the peer device, and then go to step S309.

S307: Elect a device, either the local device or the peer device, with a larger quantity of interfaces as an MCP of a direct link between the local device and the peer device, and then go to step S309.

S308: Elect a device, either the local device or the peer device, with a larger interface MAC address as an MCP of a direct link between the local device and the peer device, and then go to step S309.

In this embodiment of the present disclosure, for detailed descriptions of steps S301 to S308, reference may be made to steps S201 to S208 in the embodiment shown in FIG. 2A, and details are not repeatedly described in this embodiment.

S309: Execute a corresponding monitoring operation according to whether the local device is the MCP of the direct link, so as to monitor quality of the direct link together with the peer device.

In this embodiment, for an operation of step S309, reference may be made to the descriptions of step S103, and details are not repeatedly described in this embodiment.

S310: When the corresponding monitoring operation is executed according to whether the local device is the MCP of the direct link, if the quantity of neighbors or the MCP weight value of the local device changes, reelect, from the local device and the peer device, the MCP of the direct link.

In a specific implementation, after an MCP is elected for a direct link, a device serving as the MCP may change as a condition changes. As a possible implementation manner, if the quantity of neighbors or the MCP weight value of the local device changes, the MCP of the direct link may be reelected from the local device and the peer device. Correspondingly, because the local device and the peer device may be any communications device on the network, and the direct link may also be a direct link formed between any two neighboring communications devices on the network, if a quantity of neighbors or an MCP weight value of any communications device on the network changes, it may be triggered that an MCP is reelected for all direct links between the communications device and its neighbors.

Specifically, steps of reelecting, by the local device, the MCP for the direct link between the local device and the peer device may include:

if the quantity of neighbors of the local device is different from the quantity of neighbors of the peer device, electing a device, either the local device or the peer device, with a larger quantity of neighbors as the MCP of the direct link; and if the quantity of neighbors of the local device is the same as the quantity of neighbors of the peer device, and the MCP weight value of the local device is different from the MCP weight value of the peer device, electing a device, either the local device or the peer device, with a larger MCP weight value as the MCP of the direct link.

In a specific implementation, once a quantity of neighbors or an MCP weight value of any communications device on the network changes, it may be triggered that an MCP is reelected for all direct links between the device and its neighbors, so as to ensure that a device, either one of each pair of neighbors on the network, with a larger quantity of neighbors always serves as an MCP of a direct link between this pair of neighbors, and only when quantities of neighbors of this pair of neighbors are the same, a device with a larger MCP weight value serves as the MCP of the direct link between this pair of neighbors, thereby ensuring that a quantity of MCPs on the network is always minimum.

In this embodiment, after the local device elects the MCP of the direct link for the first time, the MCP and a DCP of the direct link immediately monitor the direct link, and the MCP collects statistics on data in a timely manner, and communicates with a network management device, which can quickly make operating data of the direct link known to the network management device in a timely manner, so that the network management device learns about an operating condition of the direct link within a short time.

Specifically, in a process of reelecting the MCP, the local device and the peer device may keep their roles unchanged, and continue monitoring quality of the direct link.

S311: Re-execute the corresponding monitoring operation according to whether the local device is the MCP of the direct link, so as to monitor the quality of the direct link together with the peer device.

In this embodiment, after the MCP is reelected, no matter whether the roles of the local device and the peer device are exchanged, it is still the MCP that performs data collecting and statistics, and communicates with the network management device. For example, before the MCP is reelected, the local device is the MCP of the direct link, and the local device executes the following operations: acquiring first data of the local device operating on the direct link; receiving second data sent by the peer device; obtaining, by statistics, operating data of the direct link according to the first data and the second data; and reporting the operating data of the direct link to the network management device. If the local device is still the MCP of the direct link after the MCP is reelected, the local device continues executing the foregoing operations; if the peer device is the MCP of the direct link after the MCP is reelected, the local device is changed from the MCP to the DCP, and the local device continues acquiring the first data of the local device operating on the direct link, but does not execute subsequent operations such as data receiving and statistics, and reporting the data to the network management device; instead, the local device sends the first data to the peer device, and the peer device obtains, by statistics, the operating data of the direct link according to the first data and the second data, and reports the operating data of the direct link to the network management device.

In a possible implementation manner, the local device is changed from the MCP of the direct link to the DCP of the direct link, and when the quantity of neighbors or the MCP weight value changes, the local device has collected the first data and the second data, but has not obtained, by statistics, the operating data of the direct link according to the first data and the second data, or has not sent the operating data, obtained by statistics, of the direct link to the network management device. In this case, there may be the following two processing manners:

Manner 1: first, the local device obtains, by statistics, the operating data of the direct link according to the first data and the second data that have been collected, and sends the operating data of the direct link to the network management device; then, the local device is changed from the MCP of the direct link to the DCP of the direct link.

Manner 2: first, the local device is changed from the MCP of the direct link to the DCP of the direct link; then, if the local device has not obtained, by statistics, the operating data of the direct link, the local device sends the collected first data and second data to the peer device, and the peer device obtains, by statistics, the operating data of the direct link and sends the operating data of the direct link to the network management device; and if the local device has obtained, by statistics, the operating data of the direct link, the local device sends the operating data, obtained by statistics, of the direct link to the peer device, and the peer device sends the operating data of the direct link to the network management device.

In this embodiment of the present disclosure, after two devices establish a neighbor relationship, either device of the two devices may automatically elect an MCP of a direct link between the two devices according to some hardware parameters of the two devices, and the MCP is responsible for collecting statistics on data that is of the two devices operating on the direct link between the two devices, to obtain operating data that is of the direct link and that is related to network quality, and sends the operating data to a network management device, so that the network management device monitors an operating condition of the direct link on a network. Automatically electing the MCP has high accuracy and is not prone to errors or omissions, and does not require manual deployment of MCPs, which may save a large amount of man power in a case of a large network size. Specifically, in this embodiment of the present disclosure, a device, on the direct link, with a larger quantity of neighbors is preferably elected as the MCP; when quantities of neighbors of the two devices are the same, the MCP is then elected according to values of parameters such as MCP weight values, quantities of interfaces, and interface MAC addresses of the two devices sequentially, which may enable multiple direct links to share one MCP, thereby effectively reducing a quantity of MCPs on the network, and improving efficiency of communication between the network management device and the MCP. In addition, when a quantity of neighbors or an MCP weight value of a device changes, an MCP may be reelected for all direct links on which the device and its neighbors are located, so that a quantity of MCPs on the network is always kept minimum.

Figure 4:
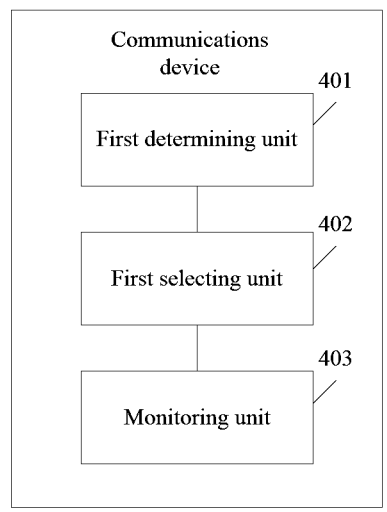
FIG. 4 is a schematic structural diagram of a communications device according to an embodiment of the present disclosure.

Referring to FIG. 4, FIG. 4 is a schematic structural diagram of a communications device according to an embodiment of the present disclosure. The communications device may be configured to execute the direct-link quality monitoring methods described in FIG. 1, FIG. 2A with FIG. 2B, and FIG. 3A with FIG. 3B. As shown in FIG. 4, the communications device may include:

a first determining unit 401, configured to determine, after a neighbor relationship is established with a peer device, whether a quantity of neighbors of a local device is the same as a quantity of neighbors of the peer device;

a first electing unit 402, configured to: when the quantity of neighbors of the local device is different from the quantity of neighbors of the peer device, elect a device, either the local device or the peer device, with a larger quantity of neighbors as a measurement control point MCP of a direct link between the local device and the peer device; and a monitoring unit 403, configured to execute a corresponding monitoring operation according to whether the local device is the MCP of the direct link, so as to monitor quality of the direct link together with the peer device.

In a specific implementation, that the local device establishes the neighbor relationship with the peer device may specifically be that:

the local device first sends a Hello message in a multicast manner, then receives a Hello reply message returned by the peer device, and finally stores the neighbor relationship between the local device and the peer device; or the local device queries, when receiving a Hello message sent by the peer device, whether the neighbor relationship has been established with the peer device, and if not, returns a Hello reply message to the peer device, and stores the neighbor relationship between the local device and the peer device.

In a specific implementation, a Hello message may carry some pieces of parameter information of a device itself, for example, a device identifier, an interface identifier of the device, an interface MAC address of the device, and a network management address of the device. After the neighbor relationship between the local device and the peer device is stored, the local device may acquire the foregoing parameter information of the peer device, also acquire the quantity of neighbors of the peer device, and communicate with the peer device.

After establishing the neighbor relationship with the peer device, optionally, the local device may send an election message to the peer device, or receive an election message sent by the peer device, where the election message carries parameters used to elect an MCP, for example, a quantity of neighbors and a quantity of interfaces of a device sending the election message. In this embodiment, the local device may receive the election message sent by the peer device, to acquire the quantity of neighbors of the peer device, so that the first determining unit 401 may determine whether the quantity of neighbors of the local device is the same as the quantity of neighbors of the peer device.

For an entire network, if more direct links share one MCP, a quantity of MCPs on the network becomes smaller; and a larger quantity of neighbors of one communications device indicates a larger quantity of direct links between the communications device and its neighbors. Therefore, in this embodiment of the present disclosure, the first electing unit 402 elects the device, either the local device or the peer device, with the larger quantity of neighbors as the MCP of the direct link between the local device and the peer device. Correspondingly, for any two neighboring communications devices on the network, when an MCP is elected, a device with a larger quantity of neighbors is elected as an MCP of a direct link between the two devices, which may greatly reduce a quantity of MCPs on the network. For example, if the local device is A, device A establishes a neighbor relationship separately with device B, device C, and device D, and a quantity of neighbors of device A is larger than a quantity of neighbors of device B, device C, and device D separately, and if device A serves as an MCP of three direct links, that is, a direct link between device A and device B, a direct link between device A and device C, and a direct link between device A and device D separately, there is only one MCP of the three direct links, which may minimize the quantity of MCPs.

In this embodiment of the present disclosure, two neighboring communications devices separately serve as an MCP and a DCP in a direct link between them. The MCP is responsible for communicating with a network management device, and collects statistics on data that is of the MCP and the DCP operating on the direct link, so as to obtain operating data of the direct link and report the operating data to the network management device; the DCP is responsible for sending data of the DCP operating on the direct link to the MCP, and the MCP completes data collecting, statistics, and reporting.

In a specific implementation, there may be multiple direct links on which the local device is located, and when the local device serves as the MCP of the direct link, and may serve as a DCP or an MCP of another direct link.

In a specific implementation, after the MCP of the direct link is elected, the local device and the peer device may first negotiate monitoring parameters, where the monitoring parameters may include a monitoring period and at least one monitoring indicator; then, the local device and the peer device start collecting statistics on data according to the negotiated monitoring parameters. Specifically, the monitoring indicator may be a network test indicator such as a packet loss rate, a delay, a jitter, or a bit error rate.

Figure 5:
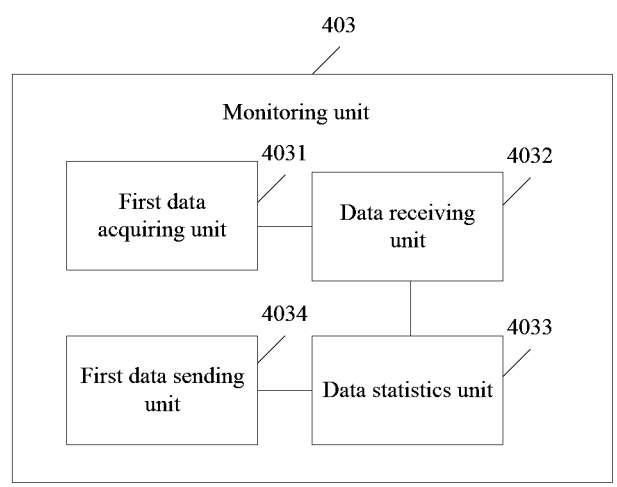
FIG. 5 is a schematic structural diagram of a monitoring unit of a communications device according to an embodiment of the present disclosure.

As a possible implementation manner, when the local device serves as the MCP of the direct link, as shown in FIG. 5, the monitoring unit 403 may include:

a first data acquiring unit 4031, configured to acquire, according to the negotiated monitoring period, first data of the local device operating in an outbound direction and in an inbound direction of the direct link;

a data receiving unit 4032, configured to receive second data that is of the peer device operating in an outbound direction and in an inbound direction of the direct link and that is sent by the peer device according to the negotiated monitoring period;

a data statistics unit 4033, configured to collect statistics on the first data and the second data, so as to obtain operating data of the direct link; and a first data sending unit 4034, configured to periodically send the operating data of the direct link to the network management device, so that the network management device monitors an operating condition of the direct link on the network, where optionally, the first data sending unit 4034 may send operating data of multiple direct links together to the network management device, so as to reduce a quantity of times of communication with the network management device, and to improve communication efficiency, and may also separately send the operating data of the multiple direct link to the network management device.

Figure 6:
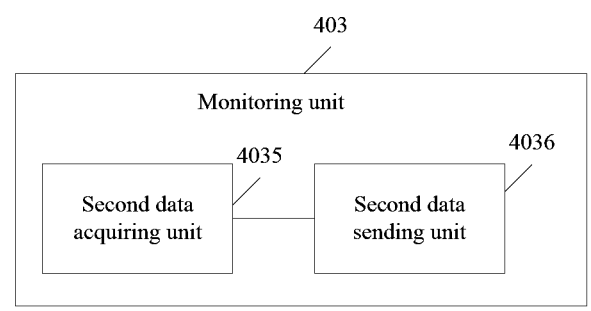
FIG. 6 is a schematic structural diagram of a monitoring unit of a communications device according to another embodiment of the present disclosure.

As another possible implementation manner, when the local device serves as a DCP on the direct link, and the peer device serves as the MCP of the direct link. As shown in FIG. 6, the monitoring unit 403 of the local device may include:

a second data acquiring unit 4035, configured to acquire, according to the negotiated monitoring period, first data of the local device operating in an outbound direction and in an inbound direction of the direct link; and a second data sending unit 4036, configured to: when the peer device is the MCP of the direct link, send the first data to the peer device according to the negotiated monitoring period.

In this case, the peer device is responsible for collecting statistics according to the first data and second data that is of the peer device operating in an outbound direction and in an inbound direction of the direct link to obtain operating data of the direct link, and sends the operating data of the direct link to the network management device.

In a specific implementation, the first data may include data that is generated in a process in which the local device operates in the outbound direction and in the inbound direction of the direct link and that is related to the negotiated monitoring indicator; the second data may include data that is generated in a process in which the peer device operates in the outbound direction and in the inbound direction of the direct link and that is related to the negotiated monitoring indicator. For example, if the monitoring indicator is a packet loss rate, the first data includes a quantity inpkts1 of data packets received on the direct link by the local device and a quantity outpkts1 of data packets sent on the direct link by the local device; correspondingly, the second data includes a quantity inpkts2 of data packets received on the direct link by the peer device and a quantity outpkts2 of data packets sent on the direct link by the peer device; and then, a packet loss rate, in a direction from the local device to the peer device, on the direct link is: pktloss1=(outpkts1−inpkts2)/outpkts1, and a packet loss rate, in a direction from the peer device to the local device, on the direct link is: pktloss2=(outpkts2−inpkts1)/outpkts2.

After collecting statistics on the operating data of the direct links on the network, the network management device may have an overall understanding of an operating condition of all direct links on the entire network, thereby implementing quality monitoring on the direct links on the network.

Figure 7:
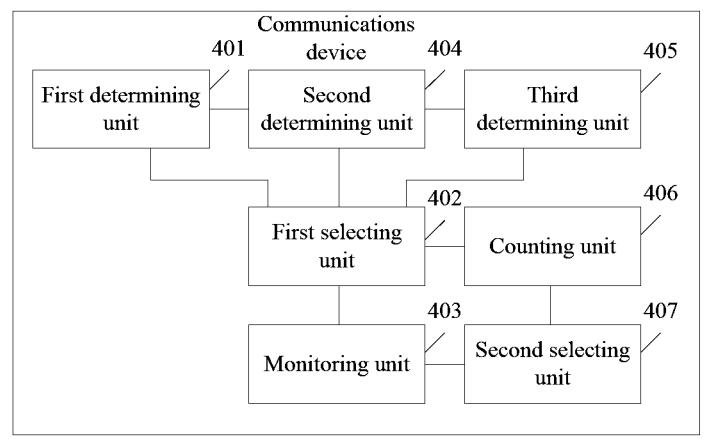
FIG. 7 is a schematic structural diagram of a communications device according to another embodiment of the present disclosure.

As a possible implementation manner, as shown in FIG. 7, the communications device may further include at least one of the following units: a second determining unit 404, a third determining unit 405, a counting unit 406, and a second electing unit 407.

The second determining unit 404 is configured to: when the quantity of neighbors of the local device is the same as the quantity of neighbors of the peer device, further determine whether an MCP weight value of the local device is the same as an MCP weight value of the peer device, where an MCP weight value of any device is used to indicate frequency that the device serves as an MCP of all direct links between the device and all neighbors.

Correspondingly, the first electing unit 402 may be configured to: when a determining result of the second determining unit 404 is no, elect a device, either the local device or the peer device, with a larger MCP weight value as the MCP of the direct link; or the first electing unit 402 may be configured to: when a determining result of the second determining unit 404 is yes, elect a device, either the local device or the peer device, with a larger interface MAC address as the MCP of the direct link.

In this embodiment of the present disclosure, the election message may further carry an MCP weight value of the device sending the election message, where an MCP weight value of any communications device is used to indicate frequency that the device serves as an MCP of all direct links between the device and all neighbors. For example, device A has totally three neighbors, that is, device B, device C, and device D, where device A serves as an MCP of direct links between device A and device C and between device A and device D, and then frequency that device A serves as an MCP is 2, and an MCP weight value of device A may be 2, or may be a value obtained after calculation based on the frequency 2. Each time after the local device is elected as an MCP, a preset value may be added to frequency that the local device serves as an MCP, for example, 1 is added; correspondingly, each time when the local device changes from an MCP to a DCP, the preset value is subtracted from the frequency that the local device serves as an MCP, so as to correspondingly adjust the MCP weight value.

As seen from the above, a larger MCP weight value of a communications device indicates that more direct links on the network use the device as an MCP, and leads to a smaller quantity of MCPs on the network. Therefore, when the quantities of neighbors of the local device and the peer device are the same, the second determining unit 404 may determine whether the MCP weight values of the local device and the peer device are the same; if the MCP weight values of the local device and the MCP value of the peer device are different, the first electing unit 402 may elect the device with the larger MCP weight value as the MCP of the direct link, so as to enable more direct links to use the device as the MCP, and to further reduce a quantity of MCPs on the network; and if the MCP weight values of the local device and the MCP value of the peer device are the same, the first electing unit 402 may elect the device with the larger interface MAC address as the MCP of the direct link.

On a network, an interface MAC address of a device may identify a location of the device, and is unique and unchangeable. Because an interface MAC address of a device is mainly used to distinguish a device from another device, as another possible implementation manner, a device, either the local device or the peer device, with a smaller interface MAC address may also be elected as the MCP of the direct link.

The third determining unit 405 is configured to: when the MCP weight value of the local device is the same as the MCP weight value of the peer device, further determine whether a quantity of interfaces of the local device is the same as a quantity of interfaces of the peer device.

Correspondingly, the first electing unit 402 may be configured to: when the quantity of interfaces of the local device is different from the quantity of interfaces of the peer device, elect a device, either the local device or the peer device, with a larger quantity of interfaces as the MCP of the direct link; or the first electing unit 402 may be configured to: when the quantity of interfaces of the local device is the same as the quantity of interfaces of the peer device, elect a device, either the local device or the peer device, with a larger interface Media Access Control MAC address as the MCP of the direct link.

A quantity of interfaces of a communications device indicates a quantity of existing and potential neighbors of the device. In a specific implementation, if the quantities of neighbors of the local device and the peer device are the same, and the MCP weight values are also the same, the third determining unit 405 may determine whether the quantity of interfaces of the local device is the same as the quantity of interfaces of the peer device; if the quantity of interfaces of the local device and the quantity of interfaces of the peer device, the first electing unit 402 may elect the device with the larger quantity of interfaces as the MCP of the direct link, so as to enable the device with more potential neighbors to be elected as the MCP of the direct link as much as possible; and if the quantity of interfaces of the local device and the quantity of interfaces of the peer device are the same, the first electing unit 402 may elect the device with the larger interface MAC address as the MCP of the direct link, or may elect a device, either the local device or the peer device, with a smaller interface MAC address as the MCP of the direct link.

The counting unit 406 is configured to: after the local device is elected as the MCP, add a preset value to the frequency that the local device serves as an MCP.

Each time after the local device is elected as the MCP, a preset value is added to the frequency that local device serves as an MCP, for example, 1 is added; correspondingly, each time when the local device changes from an MCP to a DCP, the preset value should be subtracted from the frequency that local device serves as an MCP, and the counting unit 406 correspondingly adjusts the MCP weight value of the local device. The second electing unit 407 is configured to: after the MCP of the direct link is elected and before the corresponding monitoring operation is executed according to whether the local device is the MCP of the direct link, if the quantity of neighbors or the MCP weight value of the local device changes, reelect, from the local device and the peer device, the MCP of the direct link; or configured to: when the corresponding monitoring operation is executed according to whether the local device is the MCP of the direct link, if the quantity of neighbors or the MCP weight value of the local device changes, reelect, from the local device and the peer device, the MCP of the direct link.

In a specific implementation, after an MCP is elected for a direct link, a device serving as the MCP may change as a condition changes. As a possible implementation manner, if the quantity of neighbors or the MCP weight value of the local device changes, the second electing unit 407 may reelect, from the local device and the peer device, the MCP of the direct link. Correspondingly, because the local device and the peer device may be any communications device on the network, and the direct link may also be a direct link formed between any two neighboring communications devices on the network, if a quantity of neighbors or an MCP weight value of any communications device on the network changes, it may be triggered that an MCP is reelected for all direct links between the device and its neighbors, so as to ensure that a device, either one of each pair of neighbors on the network, with a larger quantity of neighbors serves as an MCP of a direct link between this pair of neighbors, and only when quantities of neighbors of this pair of neighbors are the same, a device with a larger MCP weight value serves as the MCP of the direct link between this pair of neighbors, thereby ensuring that a quantity of MCPs on the network is always minimum.

In a specific implementation, when the MCP of the direct link is reelected, the second electing unit 407 may be specifically configured to:

when the quantity of neighbors of the local device is different from the quantity of neighbors of the peer device, elect a device, either the local device or the peer device, with a larger quantity of neighbors as the MCP of the direct link; and when the quantity of neighbors of the local device is the same as the quantity of neighbors of the peer device, and the MCP weight value of the local device is different from the MCP weight value of the peer device, elect a device, either the local device or the peer device, with a larger MCP weight value as the MCP of the direct link.

As a possible implementation manner, the second electing unit 407 may reelect the MCP of the direct link before the local device and the peer device execute corresponding operations according to their respective roles to monitor the quality of the direct link, so as to reduce a quantity of times that the roles of the local device and the peer device change in a monitoring process, and to increase stability of the MCP.

As another possible implementation manner, the second electing unit 407 may reelect the MCP of the direct link when the local device and the peer device execute corresponding operations according to their respective roles to monitor the quality of the direct link. That is, after the local device elects the MCP of the direct link for the first time, the MCP and the DCP of the direct link immediately monitor the direct link, and the MCP collects statistics on data in a timely manner, and communicates with the network management device, so that a network administrator can obtain the operating data of the direct link and have an understanding of the operating condition of the direct link as soon as possible. In this case, in a possible situation, the local device is changed from the MCP of the direct link to the DCP of the direct link, and when the quantity of neighbors or the MCP weight value changes, the local device has collected the first data and the second data, but has not obtained, by statistics, the operating data of the direct link according to the first data and the second data, or has not sent the operating data, obtained by statistics, of the direct link to the network management device. In this case, there may be the following two processing manners:

Manner 1: first, the local device obtains, by statistics, the operating data of the direct link according to the first data and the second data that have been collected, and sends the operating data of the direct link to the network management device; then, the local device is changed from the MCP of the direct link to the DCP of the direct link.

Manner 2: first, the local device is changed from the MCP of the direct link to the DCP of the direct link; then, if the local device has not obtained, by statistics, the operating data of the direct link, the local device sends the collected first data and second data to the peer device, and the peer device obtains, by statistics, the operating data of the direct link and sends the operating data of the direct link to the network management device; and if the local device has obtained, by statistics, the operating data of the direct link, the local device sends the operating data, obtained by statistics, of the direct link to the peer device, and the peer device sends the operating data of the direct link to the network management device.

Figure 8:
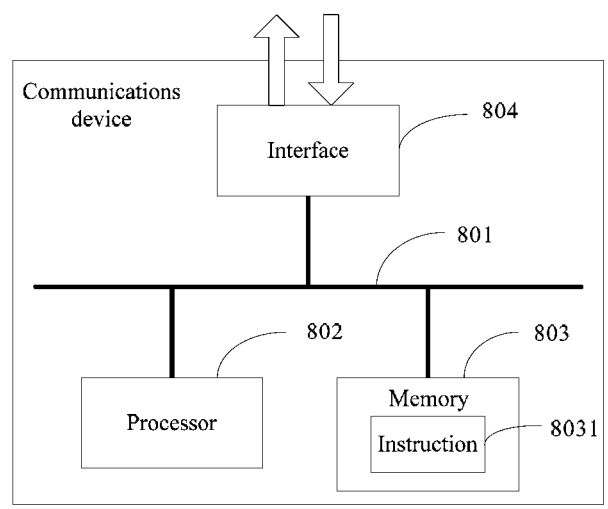
FIG. 8 is a schematic structural diagram of a communications device according to still another embodiment of the present disclosure.

As shown in FIG. 8, another embodiment of the present disclosure provides a communications device, and the communications device includes: a bus 801, and a processor 802, a memory 803, and an interface 804 that are connected to the bus, where the interface 804 is configured to communicate with another network element, the memory 803 is configured to store an instruction 8031, and the processor 802 executes the instruction 8031 and is configured to implement the methods shown in FIG. 1 to FIG. 3A and FIG. 3B.

In this embodiment of the present disclosure, after establishing a neighbor relationship with a peer device, a local device may automatically elect an MCP of a direct link between the local device and the peer device according to some hardware parameters of the two devices, and the MCP is responsible for collecting statistics on data that is of the local device and the peer device operating on the direct link, to obtain operating data that is of the direct link and that is related to network quality, and communicates with a network management device, so that the network management device monitors an operating condition of the direct link on a network. Automatically electing the MCP has high accuracy and is not prone to errors or omissions, and does not require manual deployment of MCPs, which may save a large amount of man power in a case of a large network size. Specifically, the local device preferably elects a device, on the direct link, with a larger quantity of neighbors as the MCP; when quantities of neighbors of the local device and the peer device are the same, the MCP of the direct link is then elected according to values of parameters such as MCP weight values, quantities of interfaces, and interface MAC addresses of the two devices sequentially, which may enable multiple direct links to share one MCP, thereby effectively reducing a quantity of MCPs on the network, and improving efficiency of communication between the network management device and the MCP. In addition, when the quantity of neighbors or the MCP weight value of the local device changes, an MCP may be reelected for all direct links on which the local device and its neighbors are located, so that a quantity of MCPs on the network is always kept minimum.

Correspondingly, an embodiment of the present disclosure further provides a direct-link quality monitoring system, and the system includes at least two neighboring communications devices and a network management device, where each of the at least two neighboring communications devices may be the communications device described in FIG. 4 to FIG. 7.

A sequence of the steps of the method in the embodiments of the present disclosure may be adjusted, and some steps may also be merged or removed according to an actual need.

Merging, division, and removing may be performed on the modules or the units of the device in the embodiments of the present disclosure according to an actual need.

The modules and the units in the embodiments of the present disclosure may be implemented by using a general purpose integrated circuit (for example, a central processing unit CPU) or an application-specific integrated circuit (ASIC).

A person of ordinary skill in the art may understand that all or a part of the processes of the methods in the embodiments may be implemented by a computer program instructing relevant hardware. The program may be stored in a computer readable storage medium. When the program operates, the processes of the methods in the embodiments are performed. The storage medium may include: a magnetic disk, an optical disc, a read-only memory (English: Read-Only Memory, ROM for short), or a random access memory (English: Random Access Memory, RAM for short). The foregoing implementation manners are not intended to limit the protection scope of the technical solutions. Any modification, equivalent replacement, and improvement made without departing from the principle of the foregoing implementation manners shall fall within the protection scope of the technical solutions.

What is claimed is:

1. A direct-link quality monitoring method, wherein the method comprises:
    establishing, by a local device, a neighbor relationship with a peer device;
    upon the establishment of the neighbor relationship, determining, by the local device, whether a quantity of neighbors of the local device is the same as a quantity of neighbors of the peer device;
    when the quantity of neighbors of the local device is different from the quantity of neighbors of the peer device, electing a device, wherein the device is either the local device or the peer device, with a larger quantity of neighbors as a measurement control point (MCP) of a direct link between the local device and the peer device; and
    executing a corresponding monitoring operation according to whether the local device is the MCP of the direct link, so as to monitor quality of the direct link together with the peer device.

2. The method according to claim 1, wherein after the determining whether the quantity of neighbors of the local device is the same as the quantity of neighbors of the peer device, the method further comprises:
    when the quantity of neighbors of the local device is the same as the quantity of neighbors of the peer device, further determining whether an MCP weight value of the local device is the same as an MCP weight value of the peer device, wherein:
        when the MCP weight value of the local device is different from the MCP weight value of the peer device, electing a device, wherein the device is either the local device or the peer device, with a larger MCP weight value as the MCP of the direct link; and
        an MCP weight value of a device is used to indicate a frequency that the device serves as an MCP of all direct links between the device and all neighbors.

3. The method according to claim 2, wherein after the determining whether the MCP weight value of the local device is the same as the MCP weight value of the peer device, the method further comprises:
    when the MCP weight value of the local device is the same as the MCP weight value of the peer device, further determining whether a quantity of interfaces of the local device is the same as a quantity of interfaces of the peer device, wherein:
        when the quantity of interfaces of the local device is different from the quantity of interfaces of the peer device, electing a device, wherein the device is either the local device or the peer device, with a larger quantity of interfaces as the MCP of the direct link; and
        when the quantity of interfaces of the local device is the same as the quantity of interfaces of the peer device, electing a device, wherein the device is either the local device or the peer device, with a larger interface Media Access Control (MAC) address as the MCP of the direct link.

4. The method according to claim 2, wherein after the determining whether the MCP weight value of the local device is the same as the MCP weight value of the peer device, the method further comprises:
    when the MCP weight value of the local device is the same as the MCP weight value of the peer device, electing a device, wherein the device is either the local device or the peer device, with a larger interface Media Access Control (MAC) address as the MCP of the direct link.

5. The method according to claim 2, wherein after electing the MCP of the direct link, the method further comprises:
    when the local device is elected as the MCP, adding a preset value to a frequency that the local device serves as an MCP.

6. The method according to claim 1, wherein the method further comprises one of the following:
    after electing the MCP of the direct link and before executing the corresponding monitoring operation according to whether the local device is the MCP of the direct link, and when the quantity of neighbors or the MCP weight value of the local device changes, reelecting, from the local device and the peer device, the MCP of the direct link; and when executing the corresponding monitoring operation according to whether the local device is the MCP of the direct link, and when the quantity of neighbors or the MCP weight value of the local device changes, reelecting, from the local device and the peer device, the MCP of the direct link.

7. The method according to claim 6, wherein the reelecting, from the local device and the peer device, the MCP of the direct link comprises:

when the quantity of neighbors of the local device is different from the quantity of neighbors of the peer device, electing a device, wherein the device is either the local device or the peer device, with a larger quantity of neighbors as the MCP of the direct link; and when the quantity of neighbors of the local device is the same as the quantity of neighbors of the peer device, and the MCP weight value of the local device is different from the MCP weight value of the peer device, electing a device, wherein the device is either the local device or the peer device, with a larger MCP weight value as the MCP of the direct link.

8. The method according to claim 1, wherein the executing the corresponding monitoring operation according to whether the local device is the MCP of the direct link, so as to monitor quality of the direct link together with the peer device comprises:

periodically acquiring first data that is generated in a process in which the local device operates in an outbound direction and in an inbound direction of the direct link;

when the local device is the MCP of the direct link, receiving second data that is of the peer device operating in an outbound direction and in an inbound direction of the direct link and that is periodically sent by the peer device;

collecting statistics on the first data and the second data, so as to obtain operating data of the direct link; and periodically sending the operating data of the direct link to a network management device.

9. The method according to claim 1, wherein the executing the corresponding monitoring operation according to whether the local device is the MCP of the direct link, so as to monitor quality of the direct link together with the peer device comprises:

periodically acquiring first data that is generated in a process in which the local device operates in an outbound direction and in an inbound direction of the direct link; and periodically sending the first data to the peer device when the peer device is the MCP of the direct link, so as to obtain operation data of the direct link.

10. A communications device, wherein the device comprises a non-transitory processor readable memory and a processor, wherein:

the memory is configured to store program instructions; and the processor when executing the instructions is configured to provide the following:

determine, after a neighbor relationship is established with a peer device, whether a quantity of neighbors of a local device is the same as a quantity of neighbors of the peer device;

when the quantity of neighbors of the local device is different from the quantity of neighbors of the peer device, elect a device, wherein the device is either the local device or the peer device, with a larger quantity of neighbors as a measurement control point (MCP) of a direct link between the local device and the peer device; and configured to execute a corresponding monitoring operation according to whether the local device is the MCP of the direct link, so as to monitor quality of the direct link together with the peer device.

11. The device according to claim 10, wherein the processor is further configured to provide the following when executing the instructions from the non-transitory processor readable memory:

when the quantity of neighbors of the local device is the same as the quantity of neighbors of the peer device, determine whether an MCP weight value of the local device is the same as an MCP weight value of the peer device, wherein:

when the MCP weight value of the local device is different from the MCP weight value of the peer device, elect a device, wherein the device is either the local device or the peer device, with a larger MCP weight value as the MCP of the direct link; and an MCP weight value of a device is used to indicate a frequency that the device serves as an MCP of all direct links between the device and all neighbors.

12. The device according to claim 11, wherein the processor is further configured to execute the program instructions to:

when the MCP weight value of the local device is the same as the MCP weight value of the peer device, determine whether a quantity of interfaces of the local device is the same as a quantity of interfaces of the peer device, wherein:

when the quantity of interfaces of the local device is different from the quantity of interfaces of the peer device, elect a device, wherein the device is either the local device or the peer device, with a larger quantity of interfaces as the MCP of the direct link; and when the quantity of interfaces of the local device is the same as the quantity of interfaces of the peer device, elect a device, wherein the device is either the local device or the peer device, with a larger interface Media Access Control (MAC) address as the MCP of the direct link.

13. The device according to claim 11, wherein the processor is further configured to provide the following when executing the instructions from the non-transitory processor readable memory:

when the MCP weight value of the local device is the same as the MCP weight value of the peer device, elect a device, wherein the device is either the local device or the peer device, with a larger interface Media Access Control (MAC) address as the MCP of the direct link.

14. The device according to claim 11, wherein the processor is further configured to provide the following when executing the instructions from the non-transitory processor readable memory:

after the local device is elected as the MCP, add a preset value to a frequency that the local device serves as an MCP.

15. The device according to claim 10, wherein the processor is further configured to provide one of the following when executing the instructions from the non-transitory processor readable memory:
- after the MCP of the direct link is elected and before the corresponding monitoring operation is executed according to whether the local device is the MCP of the direct link, and when the quantity of neighbors or the MCP weight value of the local device changes, reelect, from the local device and the peer device, the MCP of the direct link; and
- when the corresponding monitoring operation is executed according to whether the local device is the MCP of the direct link, and when the quantity of neighbors or the MCP weight value of the local device changes, reelect, from the local device and the peer device, the MCP of the direct link.

16. The device according to claim 15, wherein when reelecting, from the local device and the peer device, the MCP of the direct link, the processor is further configured to provide the following when executing the instructions from the non-transitory processor readable memory:
- when the quantity of neighbors of the local device is different from the quantity of neighbors of the peer device, elect a device, wherein the device is either the local device or the peer device, with a larger quantity of neighbors as the MCP of the direct link; and
- when the quantity of neighbors of the local device is the same as the quantity of neighbors of the peer device, and the MCP weight value of the local device is different from the MCP weight value of the peer device, elect a device, wherein the device is either the local device or the peer device, with a larger MCP weight value as the MCP of the direct link.

17. The device according to claim 10, wherein the processor is further configured to provide the following when executing the instructions from the non-transitory processor readable memory:
- periodically acquire first data that is generated in a process in which the local device operates in an outbound direction and in an inbound direction of the direct link;
- when the local device is the MCP of the direct link, receive second data that is of the peer device operating in an outbound direction and in an inbound direction of the direct link and that is periodically sent by the peer device;
- collect statistics on the first data and the second data, so as to obtain operating data of the direct link; and
- periodically send the operating data of the direct link to a network management device.

18. The device according claim 10, wherein the processor is further configured to provide the following when executing the instructions from the non-transitory processor readable memory:
- periodically acquire first data that is generated in a process in which the local device operates in an outbound direction and in an inbound direction of the direct link; and
- send the first data to the peer device when the peer device is the MCP of the direct link, to obtain operating data of the direct link.

* * * * *